Nov. 6, 1962 S. J. GALLA 3,062,584
VEHICULAR SEAT ASSEMBLY
Filed Jan. 31, 1961 3 Sheets-Sheet 1

STEPHEN J. GALLA
INVENTOR.

BY John R. Faulkner
John J. Roethel

ATTORNEYS

Nov. 6, 1962 S. J. GALLA 3,062,584
VEHICULAR SEAT ASSEMBLY
Filed Jan. 31, 1961 3 Sheets-Sheet 2

STEPHEN J. GALLA
INVENTOR.

BY *John R. Faulkner*
*John J. Roethel*

ATTORNEYS

Nov. 6, 1962 S. J. GALLA 3,062,584
VEHICULAR SEAT ASSEMBLY
Filed Jan. 31, 1961 3 Sheets-Sheet 3

STEPHEN J. GALLA
INVENTOR.

BY John R. Faulkner
John J. Roethel

ATTORNEYS

United States Patent Office 3,062,584
Patented Nov. 6, 1962

3,062,584
VEHICULAR SEAT ASSEMBLY
Stephen J. Galla, Detroit, Mich., assignor to Ford Motor Company, Dearborn, Mich., a corporation of Delaware
Filed Jan. 31, 1961, Ser. No. 86,236
7 Claims. (Cl. 297—374)

This invention relates to motor vehicles and more particularly to a vehicular seat assembly.

In motor vehicles of the two door type, the front seat assembly conventionally consists of a one piece seat that extends across the width of the vehicle and a back rest divided into two pivotally supported sections. It is now common practice to position the pivotal support for each back rest section in a manner to define a pivot axis that extends inwardly and rearwardly across the seat. Each back rest section, when swung about an axis having this disposition, moves forwardly and inwardly over the seat toward the center of the vehicle to facilitate access to the rear seat. The patents to Galamb et al., 2,132,729 and Herider et al., 2,627,894, are exemplary of prior art constructions of this general type.

The comfort of both the driver and passengers can be increased, particularly on trips of long duration, if the seat assembly provides for reclining adjustment of the back rest independently of the seat. In this type of construction the driver can choose the angle for the back rest which best suits his stature. The passenger may, in addition, move the seat through an even greater angle to provide an even more fully relaxed position. The back rest sections are independently operable permitting each occupant to adjust his position to his own satisfaction.

The difficulties and expense involved in constructing a front seat assembly in which a back rest section swings forwardly about an inclined axis to allow free ingress to the rear seat and also tilts rearwardly about a horizontal axis into a reclining position has limited the use of reclining seats in two door vehicles. The patent to Kramer, 2,955,644, offers one solution to the problem. In the Kramer patent the front seat assembly permitted each of the independently operable back rests to swing forwardly about an inclined axis and tilt rearwardly about a substantially horizontal axis. These axes intersect at a common pivotal inboard support for the back rest. That is, a single inboard support in the Kramer patent served as the inner pivot point for both the forward swinging and rearward tilting movement of the back rest.

The single inboard pivot utilized in the Kramer device presents a structural disadvantage. The depth of the cushion of the back rest is great enough to make it impossible to locate a common inboard pivot point in a position that will allow free movement of the back rest in both the forward and rearward directions. Because of the depth of the cushion, interference exists between the back rest and seat cushion upon movement of the back rest in any substantial angle in one or the other direction.

It is an object of this invention to provide a seat assembly in which the back rest swings forwardly about an angularly disposed axis and tilts rearwardly about a horizontal axis substantially parallel to the plane assumed by the back rest in an upright position.

It is a further object of this invention to provide a seat assembly in which the axes about which the back rest moves do not intersect at a common inboard pivot point thus allowing free movement of the back rest in a forward or rearward direction.

Further objects and advantages of this invention will become more apparent as this description proceeds particularly when considered in conjunction with the accompanying drawings in which.

Figure 1:
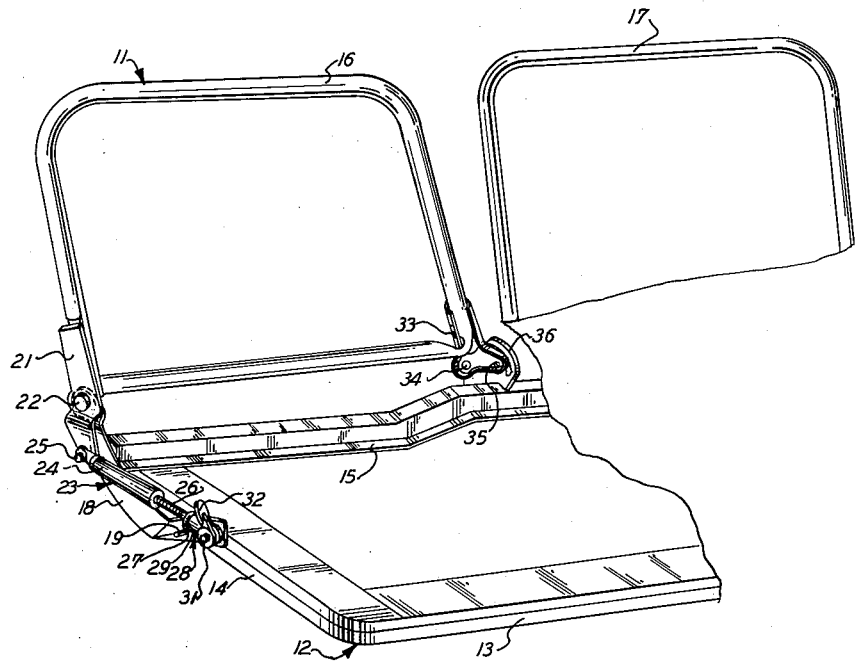
FIGURE 1 is a fragmentary perspective view of a vehicular seat incorporating the present invention showing the back rest in a reclining position.
Figure 2:
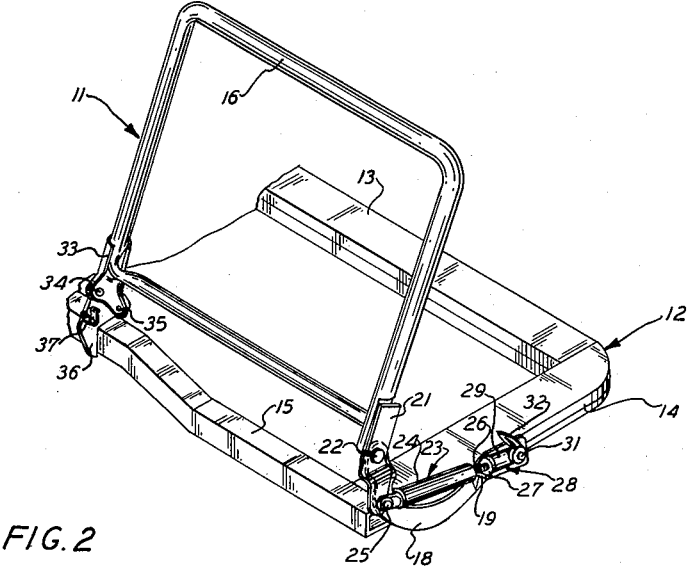
FIGURE 2 is a fragmentary perspective view of the structure shown in FIGURE 1 with the passenger back rest shown tilted forward.

Referring now in detail to the drawings and in particular to FIGURES 1 and 2, there is shown generally at 11 a portion of the front seat assembly for a motor vehicle of the two door body style. The seat assembly is illustrated with the cushion structure removed to more clearly reveal the structural details of the present invention. Seat assembly 11 consists of a seat frame 12 having front 13, side 14 and rear 15 frame members. It will be understood that seat frame 12 is supported by the vehicle floor in any known manner. The back rest of seat assembly 11 is divided and forms a passenger back rest frame 16 and a driver's back rest frame 17. Inasmuch as the construction of each of the back rests and their respective supporting structure is substantially similar, only passenger portion 16 will be described in detail.

At one side of the seat assembly 11, a link 18 is pivotally connected at its forward end to side rail 14 of seat frame 12 in any suitable manner, as by the angularly disposed pivot pin 19. A downwardly extending bracket 21 is welded or otherwise secured to back rest frame 16 at this side. The upwardly extending rear portion of link 18 is pivotally connected to bracket 21 as by pin 22.

Extending between the forward end of link 18 and the lower end of bracket 21 is a position retaining mechanism indicated generally at 23. Mechanism 23 controls the "tilt" of back rest frame 16 in a manner which will become more obvious as this description proceeds. Only one type of position retaining mechanism is specifically shown and described. It is to be understood, however, that any other suitable retaining mechanism may be utilized to secure back rest frame 16 in a variety of reclining positions.

The mechanism 23 is illustrated as including a reversible screw and nut device. That is, one in which an axial force exerted on the nut causes the screw to rotate. The well-known recirculating ball nut is an example of such a device. The nut 24 of mechanism 23 is held against rotation by means of the pin connection 25 to bracket 21. Pin connection 25, however, allows pivotal movement of the mechanism 23 relative to back rest frame 16. The exposed end of the screw 26 is secured to the rotatable portion 27 of a brake indicated generally at 28. The nonrotating portion 29 of brake 28 is pivotally connected to link 18 as by pin 31. Brake 28 is normally engaged to hold screw 26 against rotation and, accordingly, nut 24 from movement axially along screw 26. Brake 28 may be selectively released through actuation of lever 32.

Figure 9:
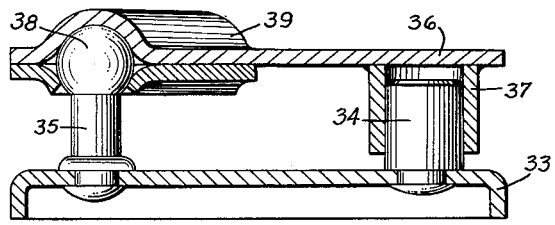
FIGURE 9 is a cross sectional view taken along line 9—9 of FIGURE 5.
Figure 3:
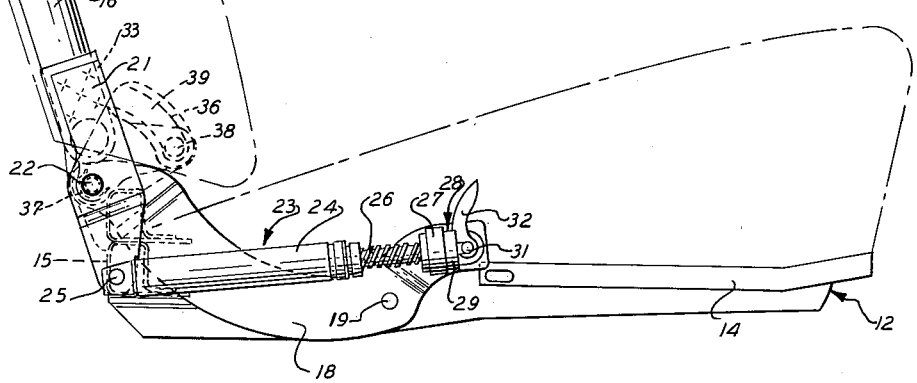
FIGURE 3 is a side elevational view showing one side of the seat assembly.

Referring now to the construction at the other side of back rest frame 16, an extension bracket 33 is welded or otherwise secured to this edge of the back rest frame 16. Two pins 34 and 35 are suitably secured to extension bracket 33. A supporting bracket 36 is welded or otherwise secured to rear frame rail 15 of the seat structure. Pins 34 and 35 cooperate with bracket 36 in a manner to be described to provide the pivotal supports at this side of back rest frame 16 for the respective swinging or tilting action of the latter. Mounted on bracket 36 is a spring clip 37 which normally accommodates pin 34. Clip 37 is constructed to allow free rotation of pin 34 therein. Pin 35 is formed with a spherical end 38 which cooperates with the track 39 formed in bracket 36 (see FIGURE 9). Spherical end 38 of pin 35 is free to rotate in track 39.

*Operation*

Pivotal connection 19 and pin 35, when at the base of track 39, furnish forward pivotal supports for back rest frame 16. It will be noted that the pivotal connection 19 is forward and below the pin 35 when the latter is at the base of the track 35. These forward pivotal supports thus define an axis which extends inwardly, upwardly and rearwardly of the seat frame 12.

Pivotal connection 22 and pin 34, when received in clip 37, furnish rearward pivotal supports for back rest frame 16. These rearward pivotal supports in the upstanding position of the back rest frame are in alignment and provide a horizontal axis about which the back rest may be tilted rearwardly.

In the normal upright position of back rest frame 16, movement forwardly about its inclined pivot axis is resisted by the inherent stability of the back rest frame 16 resulting from the location of its center of gravity with respect to this pivot axis. Mechanism 23 resists rearward tilting of back rest frame 16 about its horizontal rearward axis. In a normal upright position back frame 16 is supported by both the forward and rearward pivotal supports.

Back rest frame 16 may be tilted into a reclining position upon the release of brake 28 by actuation of lever 32. With brake 28 released and pressure applied upon back rest frame 16, screw 26 rotates and nut 24 moves axially thereon when force is applied through pin 25. Lever 32 may be released to again lock screw 26 and back rest frame 16 in the desired reclining position. As has been noted, during the rearward tilting movement back rest frame 16 is supported by the rearward pivotal supports. During this movement pin 34 rotates in clip 37. As this takes place, pin 35 traverses track 39 free of the action of bracket 36 and back rest frame 16 is supported at one side solely by pin 34 and clip 37 (see FIGURES 1, 4 and 6). Back rest frame 16 may be spring loaded to permit it to return to the upright position upon release of brake 28. As will be readily understood, screw 26 could be selectively actuated by an electric motor to provide a power actuated reclining movement.

To swing back rest frame 16 forwardly about the inclined axis defined by the forward pivotal connection it must be first returned to the upright position by release of brake 28. This permits pin 35 to abut the end of track 39. Application of sufficient force in a forward direction upon back rest frame 16 causes pin 34 to move free of clip 37. Back rest frame 16 may then move forwardly and inwardly about its forward pivotal support to the position shown in FIGURES 2 and 7. During this movement back rest frame 16 is supported at its one side solely by pin 35 and track 39.

Figure 4:
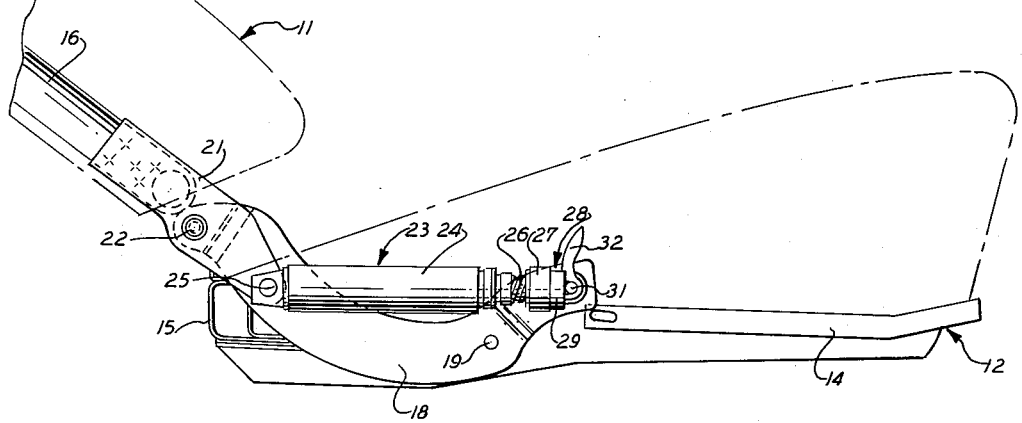
FIGURE 4 is a side elevational view in part similar to FIGURE 3 showing the back rest in a reclining position.
Figure 8:
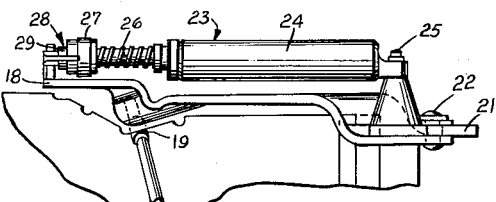
FIGURE 8 is a top plan view showing one side of the seat assembly.
Figure 5:
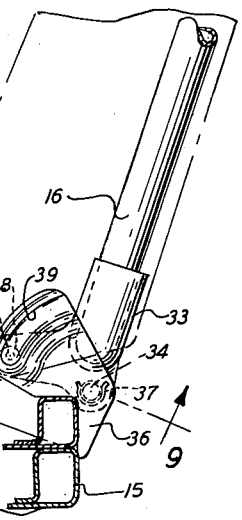
FIGURE 5 is a side elevational view showing the other side of the seat assembly.
Figure 6:
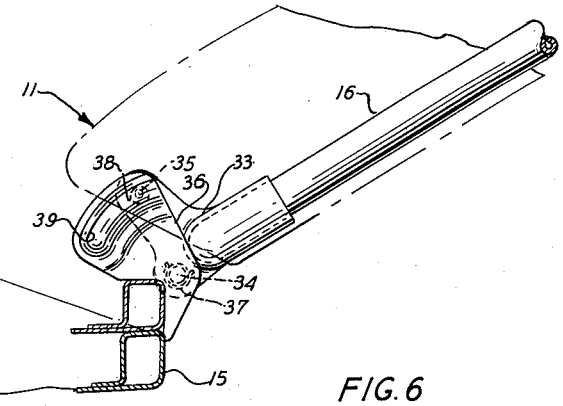
FIGURE 6 is a side elevational view in part similar to FIGURE 5 showing the back rest in a reclining position.
Figure 7:
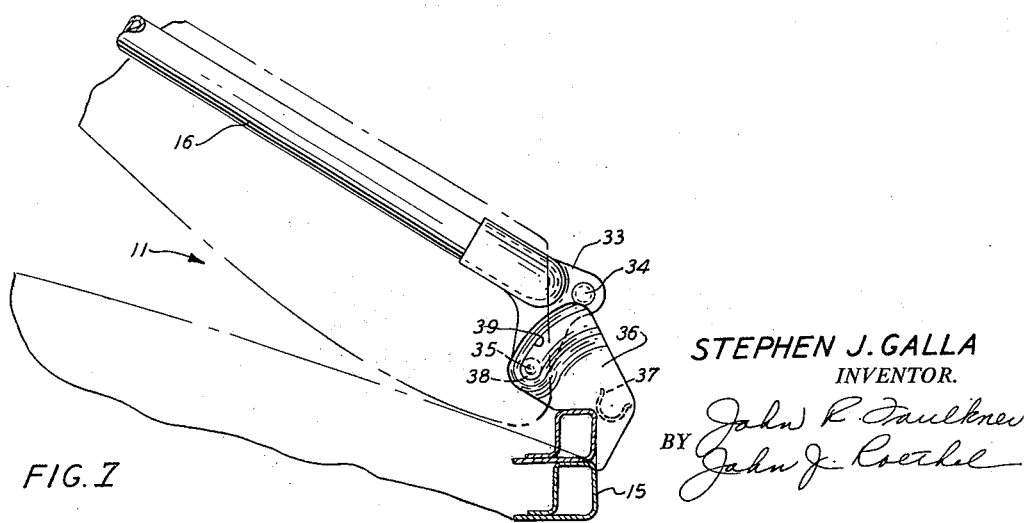
FIGURE 7 is a side elevational view in part similar to FIGURE 5 illustrating the back rest swung into a forward position.

As may be seen, when back rest 16 is swung from the forward position shown in FIGURES 2 and 7 through the upright position to the reclining position shown in FIGURES 1, 4 and 6 the support for back rest frame 16 shifts from its forward pivotal supports 19 and 35 to the rearward pivotal supports 22 and 34. The converse is also true. This shift in support for back rest frame 16 is made possible by the disconnectable pivotal connections between pins 34 and 35 and bracket 36.

Consideration of FIGURES 3–7 wherein the seat and back cushions are shown in phantom, illustrates that back rest frame 16 may move freely through a considerable arc in either direction without interference between the cushions. This is possible because of the use of the double disconnectable pivotal support at one side of the seat. Any support structure which will allow two separate and independent pivot points may be utilized to practice this invention. It is thus believed readily apparent that the use of a single inboard pivot would result in premature interference between the cushion limiting the amount of relative movement possible between the seat and back rest in one or both directions.

It will be understood that the invention is not to be limited to the exact construction shown and described but that various changes and modifications may be made without departing from the spirit and scope of the invention, as defined in the appended claims.

I claim:

1. In a vehicular seat assembly having a seat and a back rest, first means pivotally supporting said back rest contiguous to the rear edge of said seat for movement from a normal upright position forwardly and inwardly over said seat about an inclined first axis, second means pivotally supporting said back rest contiguous to the rear edge of said seat for tilting movement rearwardly and downwardly from said normal upright position about a second axis, the support of said back rest shifting to said first means upon pivotal movement of said back rest forwardly and inwardly about said first axis from said normal upright position and to said second means as said back rest pivots rearwardly and downwardly about said second axis from said normal upright position, and selectively releasable means resisting pivotal movement of said back rest at least about said second axis.

2. In a vehicular seat assembly having a seat and a back rest, first means pivotally supporting said back rest contiguous to the rear edge of said seat for movement from a normal upright position forwardly and inwardly over said seat about an inclined first axis, and second means pivotally supporting said back rest contiguous to the rear edge of said seat for tilting movement rearwardly and downwardly from said normal upright position about a second axis, all pivot points of said first and said second means being spaced from one another, the support of said back rest shifting to said first means as said back rest pivots forwardly and inwardly about said first axis from said normal upright position and to said second means as said back rest pivots rearwardly and downwardly about said second axis from said normal upright position.

3. In a vehicular seat assembly having a seat and a back rest, first means pivotally supporting said back rest, said first means including pivot elements at each side of said back rest defining an axis angularly disposed with respect to said back rest about which the latter swings from a normal upright position forwardly and inwardly over said seat, and second means pivotally supporting said back rest, said second means including pivot elements at each side of said back rest defining an axis substantially parallel to said back rest about which the latter tilts rearwardly and downwardly from said normal upright position, said pivot elements at the respective sides of said back rest being spaced from one another.

4. In a vehicular seat assembly having a seat and a back rest, first means pivotally supporting said back rest, said first means including pivot elements at each side of said back rest defining an axis angularly disposed with respect to said back rest about which the latter swings from a normal upright position forwardly and inwardly over said seat, and second means pivotally supporting said back rest, said second means including pivot elements at each side of said back rest and defining an axis substantially parallel to said back rest about which the latter tilts rearwardly and downwardly from said normal upright position, the support of said back rest shifting to said first means as said back rest swings about said angularly disposed axis forwardly and inwardly from said normal upright position and to said second means as said back rest tilts rearwardly and downwardly about said parallel axis from said normal upright position, said pivot elements at the respective side of said back rest being spaced from one another.

5. In a vehicular seat assembly having a seat and a back rest, first means pivotally supporting said back rest, said first means including pivot elements at each side of said back rest defining a first axis angularly disposed with respect to said back rest about which the latter swings from a normal upright position forwardly and inwardly over said seat, second means pivotally supporting said back rest, said second means including pivot elements at each side of said back rest defining a second axis substantially parallel to said back rest about which the latter tilts rearwardly and downwardly from said normal upright position, the support of said back rest shifting to said first means as said back rest swings forwardly and inwardly about said first axis from said normal upright position and to said second means as said back rest tilts rearwardly and downwardly about said second axis from said normal upright position said pivot elements at the respective sides of said back rest being spaced from one another, and selectively releasable means resisting pivotal movement of said back rest about at least said second axis.

6. In a vehicular seat assembly having a seat and a back rest, a member having a first pivotal connection to said seat and a second pivotal connection to said back rest at one side thereof, first means pivotally supporting said back rest at the other side thereof, second means pivotally supporting said back rest at said other side thereof, said first pivotal connection and said first means defining a first pivot axis about which said back rest may swing from a normal upright position forwardly and inwardly over said seat, said second pivotal connection and said second means defining a second pivot axis about which said back rest tilts rearwardly and downwardly from said normal upright position, and selectively releasable means resisting tilting movement of said back portion about said second pivot axis, said first and said second axis being angularly related.

7. In a vehicular seat assembly having a seat and a back rest, a member having a first pivotal connection to said seat and a second pivotal connection to said back rest at one side thereof, a third pivotal connection between said seat and said back rest at the other side thereof, and a fourth pivotal connection between said seat and said back rest at said other side, said first and said third pivotal connections defining an inclined axis about which said back rest swings forwardly and inwardly from a normal upright position over said seat, said second and said fourth pivotal connections defining an axis about which said back rest tilts rearwardly and downwardly from said normal upright position, at least two of said pivotal connections being disconnectable whereby support for said back rest shifts from one of said axes to the other of said axes as said back rest swings through said normal upright position.

References Cited in the file of this patent

UNITED STATES PATENTS

| | | |
|---|---|---|
| 2,579,305 | Cushman | Dec. 18, 1951 |
| 2,750,994 | Howell | June 19, 1956 |
| 2,928,116 | Bengstsson | Mar. 15, 1960 |
| 2,955,644 | Kramer | Oct. 11, 1960 |
| 2,972,374 | McKey | Feb. 21, 1961 |